United States Patent
Nakamura (10) Patent No.: US 8,708,427 B2
(45) Date of Patent: Apr. 29, 2014

(54) BRAKE CONTROL SYSTEM AND CONTROL METHOD FOR BRAKE CONTROL SYSTEM

(75) Inventor: Eiji Nakamura, Nishikamo-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 999 days.

(21) Appl. No.: 11/618,080

(22) Filed: Dec. 29, 2006

(65) Prior Publication Data

US 2007/0176486 A1    Aug. 2, 2007

(30) Foreign Application Priority Data

Feb. 1, 2006    (JP) ................................ 2006-024337

(51) Int. Cl.
*B60T 13/74* (2006.01)
*B60T 15/14* (2006.01)

(52) U.S. Cl.
USPC ............................. 303/3; 303/9.61; 303/152

(58) Field of Classification Search
USPC ........ 303/3, 9.61, 15, 20, 152, 186, 122, 191; 701/70, 72; 180/165
See application file for complete search history.

(56) References Cited

U.S. PATENT DOCUMENTS

| | | | |
|---|---|---|---|
| 5,399,000 A * | 3/1995 | Aoki et al. ......................... | 303/3 |
| 5,568,962 A | 10/1996 | Enomoto et al. .................. | 303/3 |
| 5,992,949 A * | 11/1999 | Nakamura et al. ......... | 303/116.1 |
| 6,142,586 A | 11/2000 | Sakai ............................. | 303/152 |
| 2001/0006306 A1 * | 7/2001 | Kagawa et al. ................. | 303/20 |
| 2002/0084691 A1 * | 7/2002 | Isono et al. ..................... | 303/10 |
| 2003/0214177 A1 | 11/2003 | Kusano et al. ............. | 303/113.1 |
| 2005/0110338 A1 | 5/2005 | Tsunehara ...................... | 303/10 |
| 2005/0269875 A1 * | 12/2005 | Maki et al. ................... | 303/152 |
| 2006/0066146 A1 | 3/2006 | Otomo .......................... | 303/151 |

FOREIGN PATENT DOCUMENTS

| | | | |
|---|---|---|---|
| DE | 198 42 472 A1 | | 3/1999 |
| EP | 1 642 795 A1 | | 4/2006 |
| JP | 05-161209 A | | 6/1993 |
| JP | 07-336806 A | | 12/1995 |
| JP | 7315186 A | * | 12/1995 |
| JP | 11-180294 | | 7/1999 |
| JP | 2000-025602 A | | 1/2000 |
| JP | 2001227666 A | * | 8/2001 |

(Continued)

OTHER PUBLICATIONS

Machine translation of JP-2001227666.*

(Continued)

*Primary Examiner* — Melody Burch
(74) *Attorney, Agent, or Firm* — Oblon, Spivak, McClelland, Maier & Neustadt, L.L.P.

(57) ABSTRACT

A hydraulic pressure brake unit includes a power hydraulic pressure source able to generate, by a supply of power, a high hydraulic independent of a brake operation by a driver; a field system which connects the power hydraulic pressure source with both first and second wheel cylinders, regulates the hydraulic pressure of operating fluid from the power hydraulic pressure source, and applies a common hydraulic pressure to both the first and second wheel cylinders; a separator valve provided so as to be able to cut off the supply of operating fluid to the second wheel cylinder via the first system; and a second system which connects the second wheel cylinder with the power hydraulic pressure source such that operating fluid can be supplied front the power hydraulic pressure source to the second wheel cylinder regardless of weather the separator valve is open or closed.

18 Claims, 5 Drawing Sheets

(56) References Cited

FOREIGN PATENT DOCUMENTS

| | | |
|---|---|---|
| JP | 2001-247025 A | 9/2001 |
| JP | 2005-219725 A | 8/2005 |
| JP | 2006-123889 | 5/2006 |

OTHER PUBLICATIONS

Office Action issued May 7, 2010 in Japan Patent Application No. JP 2006-024337, filed Feb. 1, 2006 (with English-language Translation).

* cited by examiner

BRAKE CONTROL SYSTEM AND CONTROL METHOD FOR BRAKE CONTROL SYSTEM

INCORPORATION BY REFERENCE

The disclosure of Japanese Patent Application No. 2006-024337 filed on Feb. 1, 2006 including the specification, drawings and abstract is incorporated herein by reference in its entirety.

BACKGROUND OF THE INVENTION

1. Field of the Invention

The invention relates to a brake control system that controls braking force applied to a wheel provided on a vehicle and a control method for the brake control system.

2. Description of the Related Art

Japanese Patent Application Publication No. JP-A-11-180294, for example, describes a brake hydraulic pressure control system that is provided with a regulator which is connected in series downstream of an accumulator, and a pair of linear control valves, one for increasing pressure and one for decreasing pressure, which supply and discharge brake fluid of the regulator to and from wheel cylinders of four wheels. In this system the pressure increase linear control valve and the pressure decrease linear control valve are both used for the wheel cylinders of all four wheels which enables the number of linear valves to be reduced compared to when the hydraulic pressure is controlled using separate linear control valves provided for each wheel cylinder. From the viewpoint of cost reduction of the system, therefore, using a pair of common linear control valves, i.e., the pressure increase linear control valve and the pressure decrease linear control valve, is advantageous.

In the system described above, the pair of pressure increase and pressure decrease linear control valves control the hydraulic pressure from a power hydraulic pressure source such as an accumulator so that equal hydraulic pressure is introduced into the wheel cylinders of all four wheels. However, from the viewpoint of improving vehicle stability or failsafe ability, for example, it may be desirable to vary the hydraulic pressures introduced from the power hydraulic pressure source into the wheel cylinders so that they are not all equal.

SUMMARY OF THE INVENTION

This invention thus provides a brake control system capable of more suitably controlling the braking force by increasing the degree of freedom in hydraulic pressure control of the wheel cylinders according to the situation and a control method for the brake control system.

A first aspect of the invention relates to a brake control system which includes a first wheel cylinder for applying braking force to a first wheel; a second wheel cylinder for applying braking force to a second wheel; a power hydraulic pressure source able to generate, by a supply of power; a high hydraulic pressure independent of a brake operation by a driver; a first system which connects the power hydraulic pressure source with both the first and second wheel cylinders, regulates the hydraulic pressure of operating fluid from the power hydraulic pressure source, and applies a common hydraulic pressure to both the first and second wheel cylinders; a separator valve that cuts off the supply of operating fluid to the second wheel cylinder via the first system when the separator valve is closed; and a second system which connects the second wheel cylinder with the power hydraulic pressure source such that operating fluid can be supplied from the power hydraulic pressure source to the second wheel cylinder regardless of whether the separator valve is open or closed.

According to this aspect, operating fluid is supplied from the power hydraulic pressure source to both the first and second wheel cylinders via the first system so a common hydraulic pressure can be applied to both the first and second wheel cylinders. On the other hand, under a predetermined condition, for example, the separator valve closes such that operating fluid can start to be supplied to the second wheel cylinder via the second system while operating fluid can continue to be supplied to the first wheel cylinder via the first system. As a result, operating fluid is supplied to the first and second wheel cylinders from the power hydraulic pressure source via different systems which enables different hydraulic pressures to be applied to the first and second wheel cylinders. Accordingly, in a normal state, for example, a common hydraulic pressure is applied to both the first and second wheel cylinders, which makes the hydraulic pressure easy to control. On the other hand, the hydraulic pressure applied to the first and second wheel cylinders from the power hydraulic pressure can also be made different according to the situation. As a result, the degree of freedom in hydraulic pressure control according to the situation is increased, thereby enabling the braking force to be controlled more appropriately.

The brake control system may also include a regenerative brake unit that applies braking force to the first wheel by regenerative control of a motor; and a control portion which increases the hydraulic pressure applied to the second wheel cylinder more than the hydraulic pressure applied to the first wheel cylinder under a predetermined condition when the braking force applied to the first wheel is a combination of regenerative braking force and hydraulic pressure braking force.

According to this structure, both regenerative braking force from the regenerative brake unit and hydraulic pressure braking force are applied to the first wheel, while only hydraulic pressure braking force is applied to the second wheel, i.e., regenerative braking force is not applied to the second wheel. If a common hydraulic pressure is applied to both the first and second wheel cylinders via the first system when a relatively large regenerative braking force is obtained, the braking force applied to the second wheel may end up being less than the braking force applied to the first wheel, which may result in a deviation from an ideal braking force distribution. In this kind of situation, under a predetermined condition the control portion increases the hydraulic pressure applied to the second wheel cylinder more than the hydraulic pressure applied to the first wheel cylinder, which increases the braking force distribution of the second wheel. As a result, the deviation from the ideal braking force distribution can be suppressed so that it does not affect the vehicle stability as much.

The second system may include a regulator that regulates the hydraulic pressure of the power hydraulic pressure source according to a brake operation by the driver, and a control valve provided between the regulator and the second wheel cylinder; and the control portion may increase the hydraulic pressure applied to the second wheel cylinder by cutting off the supply of operating fluid to the second wheel cylinder via the first system by closing the separator valve and supplying operating fluid that was pressure-regulated by the regulator to the second wheel cylinder by opening the control valve.

According to this structure, the second system includes a regulator that regulates the hydraulic pressure of the power hydraulic pressure source according to a brake operation by the driver, and a control valve provided between the regulator and the second wheel cylinder. Therefore, regulator pressure can be quickly introduced to the second wheel cylinder, without the driver having to perform an additional brake operation, by opening the control valve. When a common hydraulic pressure is applied to both the first and second wheel cylinders, that common hydraulic pressure is equal to the difference of the hydraulic pressure generated by the regulator according to a brake operation by the driver minus the pressure corresponding to regenerative braking force applied to the first wheel. Therefore, the hydraulic pressure applied to the second wheel cylinder can be increased more than the hydraulic pressure applied to the first wheel cylinder by cutting off the supply of operating fluid to the second wheel cylinder via the first system by closing the separator valve and introducing regulator pressure into the second wheel cylinder by opening the control valve.

The control portion may also increase the hydraulic pressure applied to the second wheel cylinder more than the hydraulic pressure applied to the first wheel cylinder when a braking force distribution of the second wheel is less than a predetermined value.

As a result, the braking force distribution can be adjusted. When a braking force required by the vehicle is generated by using a combination of regenerative braking force and hydraulic pressure braking force, the hydraulic pressure braking force becomes smaller the greater the regenerative braking force. As a result, the braking force distribution of the second wheel ends up becoming smaller than the braking force distribution of the first wheel. If the braking force distribution of the second wheel becomes smaller than a predetermined value, it may affect the vehicle stability. In this kind of case, therefore, increasing the hydraulic pressure applied to the second wheel cylinder improves the braking force distribution thereby reducing its effect on vehicle stability.

The control portion may also increase the hydraulic pressure applied to the second wheel cylinder more than the hydraulic pressure applied to the first wheel cylinder when the vehicle is turning. For example, when the road surface is slippery, there may be tendency for the vehicle to understeer or oversteer when negotiating a corner, depending on the braking distribution. In this kind of case, therefore, increasing the hydraulic pressure applied to the second wheel cylinder improves the braking force distribution, thus reducing its effect on vehicle stability.

The control portion may also increase the hydraulic pressure applied to the second wheel cylinder more than the hydraulic pressure applied to the first wheel cylinder when a target deceleration that exceeds a predetermined value is required. For example, if a target deceleration that exceeds a predetermined value is required, such as during sudden braking, the braking force distribution may adversely affect the stability of the vehicle. In this kind of case, therefore, increasing the hydraulic pressure applied to the second wheel cylinder improves the braking force distribution, thus reducing its effect on vehicle stability.

The control portion may also generate braking force to be applied to the first wheel using a combination of regenerative braking force and hydraulic pressure braking force when the separation valve is closed. Accordingly, while the separator valve is closed, braking force which is a combination of regenerative braking force and hydraulic pressure braking force is applied to the first wheel. As a result, fuel efficiency performance of the vehicle is able to be improved by using regenerative braking force applied to the first wheel while at the same time vehicle stability is improved by applying different hydraulic pressures to the first and second wheel cylinders.

The brake control system may also include a control portion which, when an abnormality has been detected in one of the first system and the second system, cuts off the supply of operating fluid to the second wheel cylinder via the first system by closing the separator valve and starts supplying operating fluid to the second wheel cylinder via the second system. Accordingly, when an abnormality has occurred in one of the two systems, i.e., in either the first system or the second system, the system in which an abnormality has occurred is cut off from the system in which an abnormality has not occurred by closing the separator valve. Operating fluid is then supplied independently from the power hydraulic pressure source to both the first and second wheel cylinders via their respective systems. As a result, braking force can be ensured by continuing to supply operating fluid from the power hydraulic pressure source to the system in which an abnormality has not occurred, thus improving the failsafe ability.

The control portion may establish which of the systems an abnormality has occurred in based on a fluctuation in the hydraulic pressure of one of the first system and the second system after closing the separator valve. For example, if an abnormality occurs in the second system, hydraulic pressure in the first system would return to normal and follow the target hydraulic pressure after the separator valve has been closed, while the hydraulic pressure in the second system would continue to be abnormal. Therefore, it is possible to establish which of the systems an abnormality has occurred in from a fluctuation in the hydraulic pressure of one of the first system and the second system after the separator valve has been closed.

A second aspect of the invention relates to a control method for a brake control system which includes a first wheel cylinder for applying braking force to a first wheel; a second wheel cylinder for applying braking force to a second wheel; a power hydraulic pressure source able to generate, by a supply of power, a high hydraulic pressure independent of a brake operation by a driver; a first system which connects the power hydraulic pressure source with both the first and second wheel cylinders, regulates the hydraulic pressure of operating fluid from the power hydraulic pressure source, and applies a common hydraulic pressure to both the first and second wheel cylinders; a separator valve that cuts off the supply of operating fluid to the second wheel cylinder via the first system when the separator valve is closed; a second system which connects the second wheel cylinder with the power hydraulic pressure source such that operating fluid can be supplied from the power hydraulic pressure source to the second wheel cylinder regardless of whether the separator valve is open or closed; and a regenerative brake unit that applies braking force to the first wheel by regenerative control of a motor. The control method comprises the step of: increasing the hydraulic pressure applied to the second wheel cylinder more than the hydraulic pressure applied to the first wheel cylinder under a predetermined condition when the braking force applied to the first wheel is a combination of regenerative braking force and hydraulic pressure braking force.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Hereinafter, example embodiments of the invention will be described in detail with reference to the drawings.

Figure 1:
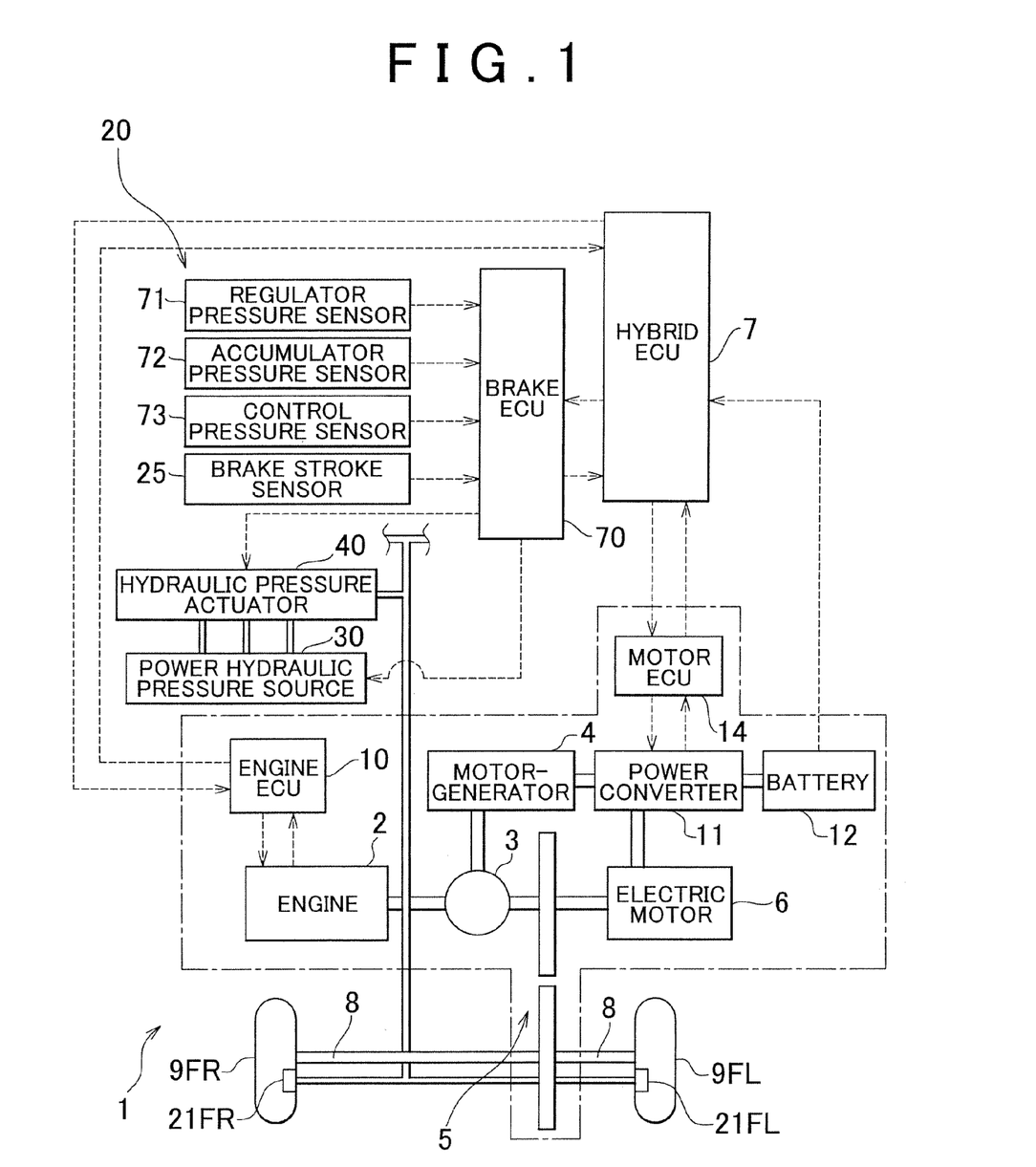
FIG. 1 is a block diagram schematically showing a vehicle in which a brake control system according a first example embodiment of the invention has been applied.

FIG. 1 is a block diagram schematically showing a vehicle to which a brake control system according to a first example embodiment of the invention has been applied. A vehicle 1 shown in the drawing is a so-called hybrid vehicle which includes an engine 2, a power split device 3 with three axles which is connected to a crankshaft that serves as an output shaft of the engine 2, a motor-generator 4 capable of generating energy which is connected to the power split device 3, an electric motor 6 which is connected to the power split device 3 via a transmission 5, and a hybrid electronic control unit (hereinafter referred to as "hybrid ECU") 7 that controls the entire drive system of the vehicle 1. Hereinafter, all electronic controls units will be referred to simply as "ECU". A right front wheel 9FR and a left front wheel 9FL, which are driven wheels of the vehicle 1, are connected to the transmission 5 via a drive shaft 8. In this example embodiment, the left and right front wheels 9FL and 9FR each correspond to a first wheel and the left and right rear wheels 9RL and 9RR, shown in FIG. 2, each correspond to a second wheel.

The engine 2 is an internal combustion engine that operates using a hydrocarbon fuel such as gasoline or gas oil and is controlled by an engine ECU 10. The engine ECU 10 can communicate with the hybrid ECU 7 and executes various controls such as fuel injection control, ignition control, and intake control of the engine 2 based on signals received from various sensors that detect the operating state of the engine 2. The engine ECU 10 also sends information regarding the operating state of the engine 2 to the hybrid ECU 7 as necessary.

The power split device 3 serves to transmit output from the electric motor 6 via the transmission 5 to the left and right front wheels 9FL and 9FR, divide the output from the engine 2 between the motor-generator 4 and the transmission 5, and decelerate or accelerate the speeds of the electric motor 6 and the engine 2. The motor-generator 4 and the electric motor 6 are both connected to a battery 12 via a power converter 11 that includes an inverter and is connected to a motor ECU 14. This motor ECU 14 can also communicate with the hybrid ECU 7 and controls the motor-generator 4 and the electric motor 6 via the power converter 11 based on control signals and the like from the hybrid ECU 7. The hybrid ECU 7, the engine ECU 10, and the motor ECU 14 described above are each made up of a microprocessor that includes a CPU as well as ROM for storing various programs, RAM for temporarily storing data, an input/output port, a communication portion, and the like.

The left and right front wheels 9FL and 9FR can be driven by output from the electric motor 6 by supplying power from the battery 12 to the electric motor 6 via the power converter 11 according to control by the hybrid ECU 7 and the motor ECU 14. The vehicle 1 can also be driven by the engine 2 in an operating range with good engine efficiency. At this time, the electric motor 6 can be driven or the battery 12 can be charged via the power converter 11 using power generated by the motor-generator 4 by transferring some of the output from the engine 2 to the motor-generator 4 via the power split device 3.

Also, when braking the vehicle 1, the electric motor 6 can be rotated by power transmitted from the front wheels 9FR and 9FL and made to operate as a generator based on control by the hybrid ECU 7 and the motor ECU 14. That is, the electric motor 6, the power converter 11, the hybrid ECU 7, and the motor ECU 14 and the like function as a regenerative brake unit that applies regenerative braking force to the left and right front wheels 9FL and 9FR by regenerating the operating energy of the vehicle 1 as electrical energy.

Figure 2:
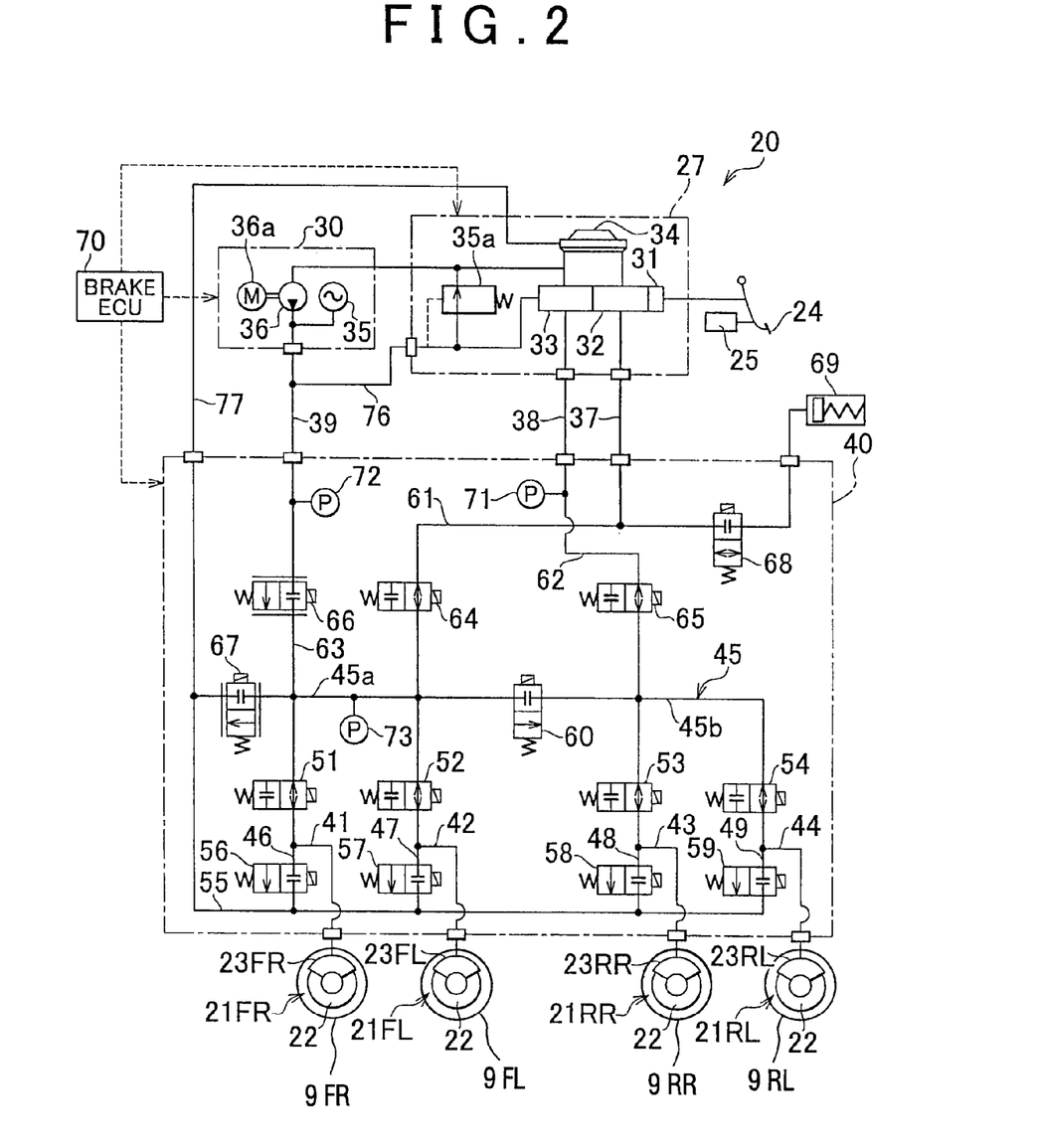
FIG. 2 is a system diagram of a hydraulic pressure brake unit according to the first example embodiment.

The vehicle 1 is also provided with a hydraulic pressure brake unit 20 shown in FIG. 2 in addition to this kind of regenerative brake unit. Therefore, the vehicle 1 is able to brake by executing coordinated regenerative brake control that coordinates these two units. The vehicle 1 in this example embodiment is able to generate the desired braking force using a combination of both regenerative braking and hydraulic pressure braking by executing coordinated brake regenerative control.

FIG. 2 is a system diagram of the hydraulic pressure brake unit 20 according to the first example embodiment of the invention. As shown in the drawing, the hydraulic pressure brake unit 20 includes disc brake units 21FR, 21FL, 21RR and 21RL provided for corresponding wheels, a master cylinder unit 27, a power hydraulic pressure source 30, and a hydraulic pressure actuator 40.

The disc brake units 21FR, 21FL, 21RR, and 21RL apply braking force to the right front wheel 9FR of the vehicle 1, the left front wheel 9FL of the vehicle 1, the right rear wheel 9RR of the vehicle 1, and the left rear wheel 9RL of the vehicle 1, respectively. The master cylinder unit 27, which serves as a manual hydraulic pressure source, discharges brake fluid pressurized according to the operating amount by the driver of a brake pedal 24, which serves as a brake operating member, toward the disc brake units 21FR to 21RL. The power hydraulic pressure source 30 receives power and pressurizes the brake fluid to a high pressure which it then is able to discharge toward the disc brake units 21FR to 21RL independent of an operation of the brake pedal 24 by the driver. The hydraulic pressure actuator 40 appropriately adjusts the hydraulic pressure of the brake fluid that was discharged from the power hydraulic pressure source 30 or the master cylinder unit 27, and supplies that adjusted hydraulic pressure to the disc brake units 21FR to 21RL.

The disc brake units 21FR to 21RL, the master cylinder unit 27, the power hydraulic pressure source 30, and the hydraulic pressure actuator 40 will each now be described in detail. The disc brake units 21FR and 21RL each include a brake disc 22 and a wheel cylinder 23FR to 23RL that is housed in a brake caliper. Each wheel cylinder 23FR to 23RL is connected to the hydraulic pressure actuator 40 via a different flow path. Hereinafter, the wheel cylinders 23FR to 23RL will collectively be referred to as "wheel cylinders 23" as appropriate.

When brake fluid is supplied from the hydraulic pressure actuator 40 to the wheel cylinder 23, in the disc brake units 21FR to 21RL a brake pad which serves as a friction member is pushed against the brake disc 22 which rotates together with the wheel. As a result, braking force from the hydraulic pressure is applied to the wheels. In this example embodiment, the disc brake units 21FR to 21RL are used. Alternatively, another braking force apply mechanism that includes the wheel cylinder 23, such as a drum brake, for example, may also be used.

In this example embodiment, the master cylinder unit 27 is a master cylinder with a hydraulic pressure booster and includes a hydraulic pressure booster 31, a master cylinder 32, a regulator 33, and a reservoir 34. The hydraulic pressure booster 31 is operatively linked to the brake pedal 24 and serves to amplify the pedal depression force applied to the brake pedal 24 and transmit that amplified force to the master cylinder 32. The pedal depression force is amplified by supplying brake fluid from the power hydraulic pressure source 30 to the hydraulic pressure booster 31 via the regulator 33. The master cylinder 32 generates a master cylinder pressure having a predetermined multiplication factor with respect to the pedal depression force.

The reservoir 34 which stores brake fluid is arranged on an upper portion of the master cylinder 32 and the regulator 33. The master cylinder 32 is communicated with the reservoir 34 when the brake pedal 24 is released. The regulator 33 regulates and discharges hydraulic pressure from the power hydraulic pressure source 30 according to a brake operation by the driver. The regulator 33 is communicated with both the reservoir 34 and an accumulator 35 of the power hydraulic pressure source 30 and generates hydraulic pressure that is substantially equal to the master cylinder pressure using the reservoir 34 as a low pressure source and the accumulator 35 as a high pressure source. Hereinafter, the hydraulic pressure in the regulator will be referred to as "regulator pressure" where appropriate.

The power hydraulic pressure source 30 includes the accumulator 35 and a pump 36. The accumulator 35 converts pressure energy of brake fluid, the pressure of which has been raised by the pump 36, into pressure energy of a filler gas such as nitrogen of around 14 to 22 MPa, for example, which it then stores. The pump 36 has a motor 36a as a drive source. The inlet of the pump 36 is connected to the reservoir 34 while the outlet of the pump 36 is connected to the accumulator 35. Also, the accumulator 35 is also connected to a relief valve 35a provided in the master cylinder unit 27. If the pressure of the brake fluid in the accumulator 35 rises abnormally high, such as to a pressure of around 25 MPa, for example, the relief valve 35a opens, returning high pressure brake fluid to the reservoir 34.

As described above, the hydraulic pressure brake unit 20 has the master cylinder 32 as a supply source for brake fluid for the wheel cylinders 23, the regulator 33, and the accumulator 35. A master conduit 37 is connected to the master cylinder 32, a regulator conduit 38 is connected to the regulator 33, and an accumulator conduit 39 is connected to the accumulator 35. The master conduit 37, the regulator conduit 38, and the accumulator conduit 39 are all connected to the hydraulic pressure actuator 40. That is, the master cylinder 32, the regulator 33, and the accumulator 35 are all connected in parallel to the hydraulic pressure actuator 40 that serves as the hydraulic pressure source.

Also, a branch conduit 76 branches off midway from the accumulator conduit 39. This branch conduit 76 is connected to the master cylinder unit 27. Brake fuel stored in the accumulator 35 is supplied to the regulator 33 of the master cylinder unit 27 via the accumulator conduit 39 and the branch conduit 76. That is, the power hydraulic pressure source 30, the regulator 33, and the hydraulic pressure actuator 40 are connected in series in that order.

The hydraulic pressure actuator 40 which serves as an operating fluid supply system in this example embodiment includes an actuator block formed of a plurality of flow lines, as well as a plurality of electromagnetic control valves. The flow lines that form the actuator block include individual flow lines 41, 42, 43, and 44, as well as a main flow line 45. The individual flow lines 41 to 44 all branch off from the main flow line 45 and are connected to the wheel cylinders 23FR, 23FL, 23RR, and 23RL of corresponding disc brake units 21FR, 21FL, 21RR, and 21RL, respectively. Accordingly, communication is able to be provided between each of the wheel cylinders 23 and the main flow line 45.

Further, ABS holding valves 51, 52, 53, and 54 are provided midway in the individual flow lines 41, 42, 43, and 44, respectively. Each of these ABS holding valves 51 to 54 is a normally open electromagnetic control valve which has a solenoid that is controlled on and off and a spring, and is open when the solenoid is de-energized. When open, the ABS holding valves 51 to 54 allow brake fluid to flow in both directions. That is, the ABS holding valves 51 to 54 allow brake fluid to flow both from the main flow line 45 to the wheel cylinders 23, as well as from the wheel cylinders 23 to the main flow line 45. When the solenoids are energized and the ABS holding valves 51 to 54 close, brake fluid is prevented from flowing through the individual flow lines 41 to 44.

Moreover, the wheel cylinders 23 are connected to a reservoir flow line 55 via pressure decrease flow lines 46, 47, 48, and 49 which are connected to the individual flow lines 41 to 44, respectively. ABS pressure decrease valves 56, 57, 58, and 59 are provided midway in the pressure decrease flow lines 46, 47, 48, and 49, respectively. The ABS pressure decrease valves 56 to 59 are normally closed electromagnetic control valves each having a solenoid that is controlled on and off and a spring, and are closed when the solenoid is de-energized. When the ABS pressure decrease valves 56 to 59 are closed, brake fluid is prevented from flowing through the pressure decrease flow lines 46 to 49. When the solenoids are energized and the ABS pressure decrease valves 56 to 59 open, brake fluid is allowed to flow through the pressure decrease flow lines 46 to 49 such that brake fluid circulates from the wheel cylinders 23 to the reservoir 34 via the pressure decrease flow lines 46 to 49 and the reservoir flow line 55. The reservoir flow line 55 is connected to the reservoir 34 of the master cylinder unit 27 via a reservoir conduit 77.

The main flow line 45 has a separator valve 60 disposed midway therein. This separator valve 60 divides the main flow line 45 into a first flow line 45a that connects with the individual flow lines 41 and 42, and a second flow line 45b that connects with the individual flow lines 43 and 44. The first flow line 45a is connected via the individual flow lines 41 and 42 to the wheel cylinders 23FR and 23FL, respectively, on the front wheel side. The second flow line 45b is connected via the individual flow lines 43 and 44 to the wheel cylinders 23RR and 23RL, respectively, on the rear wheel side.

The separator valve 60 is a normally closed electromagnetic control valve which has a solenoid that is controlled on and off and a spring, and is closed when the solenoid is de-energized. When the solenoid is energized and the separator valve 60 opens, brake fluid is able to flow from the first flow line 45a to the second flow line 45b. When the separator valve 60 is closed, brake fluid is prevented from flowing through the main flow line 45 and thus is prevented from being supplied from the power hydraulic pressure source 30 to the wheel cylinders 23RR and 23RL on the rear wheel side.

Also, a master flow line 61 and a regulator flow line 62 which are communicated with the main flow line 45 are also formed in the hydraulic pressure actuator 40. More specifically, the master flow line 61 is connected to the first flow line 45a of the main flow line 45 and the regulator flow line 62 is connected to the second flow line 45b of the main flow line 45. Also, the master flow line 61 is connected to the master conduit 37 which is communicated with the master cylinder 32, and the regulator flow line 62 is connected to the regulator conduit 38 which is communicated with the regulator 33.

The master flow line 61 has a master cutoff valve 64 disposed midway therein. This master cutoff valve 64 is a normally open electromagnetic control valve which has a solenoid that is controlled on and off and a spring, and is open when the solenoid is de-energized. When the master cutoff valve 64 is open, brake fluid is allowed to flow in both directions between the master cylinder 32 and the first flow line 45a of the main flow line. When the solenoid is energized and the master cutoff valve 64 closes, brake fluid is prevented from flowing through the master flow line 61.

Also, a stroke simulator 69 is connected to the master flow line 61 via a simulator cutoff valve 68 on the upstream side of the master cutoff valve 64. That is, the simulator cutoff valve 68 is provided in the flow line that connects the master cylinder 32 and the stroke simulator 69. The simulator cutoff valve 68 is a normally closed electromagnetic control valve which has a solenoid that is controlled on and off and a spring, and is closed when the solenoid is de-energized. When the simulator cutoff valve 68 is closed, brake fluid is prevented from flowing between the master flow line 61 and the stroke simulator 69. When the solenoid is energized and the simulator cutoff valve 68 opens, brake fluid is able to flow in both directions between the master cylinder 32 and the stroke simulator 69.

The stroke simulator 69 includes a plurality of pistons and a spring. When the simulator cutoff valve 68 is open, the stroke simulator 69 creates a reaction force according to the depression force on the brake pedal 24 exerted by the driver. The stroke simulator 69 of this example embodiment has a multistage spring characteristic to improve the feeling of the brake operation by the driver, which is preferable.

The regulator flow line 62 has a regulator cutoff valve 65 disposed midway therein. This regulator cutoff valve 65 is a normally open electromagnetic control valve which has a solenoid that is controlled on and off and a spring, and is open when the solenoid is de-energized. When the regulator cutoff valve 65 is open, brake fluid is allowed to flow in both directions between the regulator 33 and the second flow line 45b of the main flow line 45. When the solenoid is energized and the regulator cutoff valve 65 closes, brake fluid is prevented from flowing through the regulator flow line 62.

In addition to the master flow line 61 and the regulator flow line 62, an accumulator flow line 63 is also formed in the hydraulic pressure actuator 40. One end of the accumulator flow line 63 is connected to the first flow line 45a of the main flow line 45, while the other end of the accumulator flow line 63 is connected to the accumulator conduit 39 that is communicated with the accumulator 35.

The accumulator flow line 63 has a pressure increase linear control valve 66 disposed midway therein. Also, the accumulator flow line 63 and the first flow line 45a of the main flow line 45 are connected to the reservoir flow line 55 via a pressure decrease linear control valve 67. The pressure increase linear control valve 66 and the pressure decrease linear control valve 67 are both normally closed electromagnetic control valves which each have a linear solenoid and a spring, and are closed when the solenoids are de-energized. The valve opening amounts of the pressure increase linear control valve 66 and the pressure decrease linear control valve 67 are adjusted in proportion to a current supplied to the respective solenoids.

The pressure increase linear control valve 66 is provided as a common linear control valve to increase the pressure in the plurality of wheel cylinders 23 provided for corresponding wheels. Also, the pressure decrease linear control valve 67 is similarly provided as a common control valve to decrease the pressure in the wheel cylinders 23. That is, in this example embodiment, the pressure increase linear control valve 66 and the pressure decrease linear control valve 67 are provided as a pair of common control valves which control the supply and discharge of operating fluid discharged from the power hydraulic pressure source 30 to and from each wheel cylinder 23.

Here, the differential pressure between the inlet and outlet of the pressure increase linear control valve 66 corresponds to the differential pressure between the pressure of the brake fluid in the accumulator 35 and the pressure of the brake fluid in the main flow line 45. The differential pressure between the inlet and outlet of the pressure decrease linear control valve 67 corresponds to the differential pressure between the pressure of the brake fluid in the main flow line 45 and the pressure of the brake fluid in the reservoir 34. Also, when the electromagnetic driving force corresponding to the power supplied to the linear solenoids of the pressure increase linear control valve 66 and the pressure decrease linear control valve 67 is designated F1, the urging force of the springs is designated F2, and the acting force of the differential pressure according to the differential pressures between the inlets and outlets of the pressure increase linear control valve 66 and the pressure decrease linear control valve 67 is designated F3, the relationship can be written as F1+F3=F2. Accordingly, the differential pressures between the inlets and outlets of the pressure increase linear control valve 66 and the pressure decrease linear control valve 67 can be controlled by continually controlling the power supplied to the linear solenoids of the pressure increase linear control valve 66 and the pressure decrease linear control valve 67.

In this example embodiment, a first system is formed that includes the pair of common control valves, i.e., the pressure increase linear control valve 66 and the pressure decrease linear control valve 67, and a second system is formed that includes the regulator 33 and the regulator cutoff valve 65. The first system further includes the accumulator conduit 39, the accumulator flow line 63, the first and second flow lines 45a and 45b of the main flow line 45, and the individual flow lines 41 to 44. This first system thus connects the power hydraulic pressure source 30 to the wheel cylinders 23. Furthermore, the second system also includes the accumulator flow line 39, the branch conduit 76, the regulator conduit 38, the regulator flow line 62, the second flow line 45b of the main flow line 45, and the individual flow lines 43 and 44 on the rear wheel side. This second system thus connects the power hydraulic pressure source 30 to the wheel cylinders 23RR and 23RL on the rear wheel side.

Therefore, when the separator valve 60 and the ABS holding valves 51 to 54 are open a common hydraulic pressure from the power hydraulic pressure source 30 is applied to all of the wheel cylinders 23 via the first system. This hydraulic pressure is commonly controlled in the wheel cylinders 23 by supplying and discharging brake fluid using the pressure increase linear control valve 66 and the pressure decrease linear control valve 67. Also, regulator pressure can be introduced into the wheel cylinders 23RR and 23RL on the rear wheel side via the second system. Opening the regulator cutoff valve 65 enables regulator pressure to be introduced to the wheel cylinders 23RR and 23RL on the rear wheel side not only when the separator valve 60 is closed, but also when the separator valve 60 is open, i.e., irrespective of whether the separator valve 60 is open or closed.

In the hydraulic pressure brake unit 20, the power hydraulic pressure source 30 and the hydraulic pressure actuator 40 are controlled by a brake ECU 70 which serves as a control portion in this example embodiment. The brake ECU 70 is formed as a microprocessor that includes a CPU, as well as ROM for storing various programs, RAM for temporarily storing data, an input/output port a communication port, and the like. The brake ECU 70 can communicate with the main hybrid ECU 7 and the like and control the hydraulic pressure braking force by controlling the pump 36 of the power hydraulic pressure source 30 and the electromagnetic control valves 51 to 54, 56 to 59, 60, and 64 to 68 which form the hydraulic pressure actuator 40 based on control signals from the hybrid ECU 7 and signals from various sensors.

The brake ECU 70 is connected to a regulator pressure sensor 71, an accumulator pressure sensor 72, and a control pressure sensor 73. The regulator pressure sensor 71 detects the pressure of the brake fluid in the regulator flow line 62 upstream of the regulator cutoff valve 65, i.e., the regulator pressure, and sends a signal indicative of the detected value to the brake ECU 70. The accumulator pressure sensor 72 detects the pressure of the brake fluid in the accumulator flow line 63 upstream of the pressure increase linear control valve 66, i.e., the accumulator pressure, and sends a signal indicative of the detected value to the brake ECU 70. The control pressure sensor 73 detects the pressure of the brake fluid in the first flow line 45a of the main flow line 45 and sends a signal indicative of the detected value to the brake ECU 70. The detected values from these pressure sensors 71 to 73 are sequentially sent to the brake ECU 70 at predetermined intervals of time and stored in predetermined amounts in a predetermined storage area of the brake ECU 70.

When the separator valve 60 is open thus communicating the first flow line 45a and the second flow line 45b of the main flow line 45 with each other, the output value from the control pressure sensor 73 indicates the hydraulic pressure on the low pressure side of the pressure increase linear control valve 66 as well as the hydraulic pressure on the high pressure side of the pressure decrease linear control valve 67. Therefore, this output value can be used to control the pressure increase linear control valve 66 and the pressure decrease linear control valve 67. Also, when the pressure increase linear control valve 66 and the pressure decrease linear control valve 67 are closed and the master cut-off valve 64 is open, the output value of the control pressure sensor 73 indicates the master cylinder pressure. Furthermore, when the separator valve 60 is open thus communicating the first flow line 45a and the second flow line 45b of the main flow line 45 with each other, the ABS holding valves 51 to 54 are open, and the ABS pressure decrease valves 56 to 59 are closed, the output value from the control pressure sensor 73 indicates the operating fluid pressure applied to the wheel cylinders 23, i.e., the wheel cylinder pressure.

Moreover, a stroke sensor 25 is provided on the brake pedal 24 and is also one of the sensors connected to the brake ECU 70. The stroke sensor 25 detects the pedal stroke as an operating amount of the brake pedal 24 and sends a signal indicative of the detected value to the brake ECU 70. The output value from the stroke sensor 25 is also sequentially sent to the brake ECU 70 at predetermined intervals of time and stored in predetermined amounts in a predetermined storage area of the brake ECU 70. Brake operating state detecting means other than the stroke sensor 25 may also be provided in addition to, or instead of, the stroke sensor 25 and connected to the brake ECU 70. The brake operating state detecting means may be, for example, a pedal depression force sensor that detects the operating force exerted on the brake pedal 24 or a brake switch that detects when the brake pedal 24 is depressed. Also, a wheel speed sensor and steering angle sensor and the like, not shown, are also connected to the brake ECU 70. These sensors send signals indicative of detected values to the brake ECU 70 at predetermined intervals of time, where they are then stored in a predetermined storage area.

The hydraulic pressure brake unit 20 structured as described above is capable of executing coordinated regenerative brake control. The hydraulic pressure brake unit 20 starts braking upon receiving a brake command. This brake command is generated when braking force needs to be applied to the vehicle. For example, the brake command is generated when the driver operates the brake pedal 24 or when the distance to another vehicle becomes less than a predetermined distance when the distance to the other vehicle is being automatically controlled while running.

Upon receiving a brake command, the brake ECU 70 calculates the hydraulic pressure braking force to be generated by the hydraulic pressure brake unit 20 as the remaining braking force obtained by subtracting the braking force obtained through regeneration from the total required braking force that needs to be applied to the vehicle. This is because it is preferable to give priority to using the regenerative braking force in order to better improve fuel efficiency. Here, the value indicating the magnitude of the regenerative braking force is supplied from the hybrid ECU 7 to the hydraulic pressure brake unit 20. The brake ECU 70 then calculates a target hydraulic pressure for the wheel cylinders 23 based on the calculated hydraulic pressure braking force. The brake ECU 70 then determines the value of the current to be supplied to the pressure increase linear control valve 66 and the pressure decrease linear control valve 67 by feedback control so that the wheel cylinder pressure becomes equal to the target hydraulic pressure.

As a result, in the hydraulic pressure brake unit 20, hydraulic pressure braking force is applied to the wheels by supplying brake fluid from the power hydraulic pressure source 30 to the wheel cylinders 23 via the pressure increase linear control valve 66. Also, the hydraulic pressure braking force applied to the wheels is adjusted by discharging brake fluid from the wheel cylinders 23 via the pressure decrease linear control valve 67 as necessary. At this time, the brake ECU 70 opens the separator valve 60 to supply brake fluid from the power hydraulic pressure source 30 to the rear wheel side and closes the regulator cut-off valve 65 so that brake fluid discharged from the regulator 33 is not supplied to the main flow line 45. Moreover, the brake ECU 70 closes the master cut-off valve 64 and opens the simulator cut-off valve 68 to supply brake fluid that is discharged from the master cylinder 32 following an operation of the brake pedal 24 by the driver to the stroke simulator 69.

In this example embodiment, normal coordinated regenerative brake control is executed while the vehicle is running because using regenerative braking force improves the fuel efficiency performance of the vehicle. Regenerative braking force is applied to the front wheels, but not to the rear wheels. In addition, in coordinated regenerative brake control, hydraulic pressure is introduced equally into all of the wheel cylinders 23 via the pressure increase linear control valve 66 such that the hydraulic pressure braking force applied to all of the wheels is equal. The control mode for introducing equal hydraulic pressure to all of the wheel cylinders 23 will hereinafter be referred to as "common control mode" as appropriate.

Figure 3:
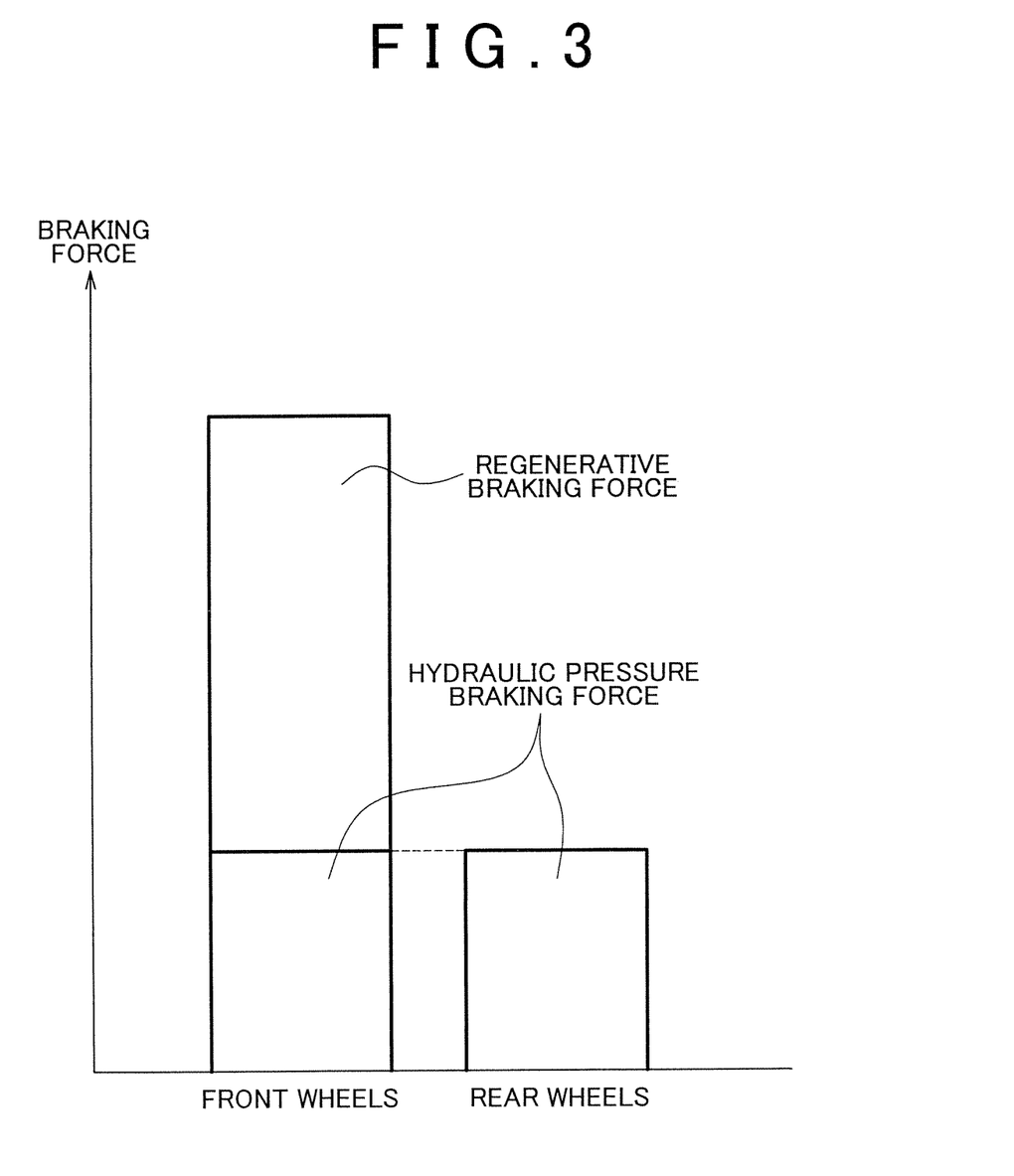
FIG. 3 is a graph of braking force distribution between front and rear wheels.

Therefore, when executing coordinated regenerative brake control, the braking force of the front wheels is greater than the braking force of the rear wheels by the amount of the regenerative braking force that is applied, as shown in FIG. 3. As a result, when a relatively large regenerative braking force is obtained, in particular, the deviation from the ideal braking force distribution may become large. In an extreme case, the braking force of the rear wheels would end up being zero if the total required braking force were provided by only regenerative braking force.

This kind of deviation from the ideal braking force distribution may adversely affect the stability of the vehicle. For example, when the braking force distribution is offset to the front wheels, the front wheels may tend to lockup on a slippery road surface in which the friction coefficient is low, i.e., a low μ road, so there may be a tendency for the vehicle to under steer when negotiating a corner. It is therefore desirable to improve vehicle stability by suppressing a deviation from the ideal braking force distribution while achieving better fuel efficiency through coordinated regenerative brake control.

Therefore, in this example embodiment, the brake ECU 70 executes an "independent control mode" which makes the hydraulic pressure applied to the wheel cylinders 23 provided on specific wheels different from the hydraulic pressure applied to the wheel cylinders 23 provided on the wheels other than the specific wheels. More specifically, the brake ECU 70 increases the wheel cylinder pressure on the rear wheel side to which regenerative braking force is not applied more than the wheel cylinder pressure on the front wheel side to which regenerative braking force is applied. In order to do this, the brake ECU 70 closes the separator valve 60 and supplies brake fluid discharged from the power hydraulic pressure source 30 to the wheel cylinders 23FR and 23FL on the front wheel side via the pressure increase linear control valve 66 and the like using the first system, similar to the common control mode. Meanwhile, the brake ECU 70 opens the regulator cut-off valve 65 and supplies brake fluid to the wheel cylinders 23RR and 23RL on the right wheel side via the regulator 33 and the like using the second system. As a result, coordinated control of regenerative braking and hydraulic pressure braking can be continued on the front wheel side while regulator pressure is quickly introduced to the rear wheel side to increase the wheel cylinder pressure there.

Figure 4:
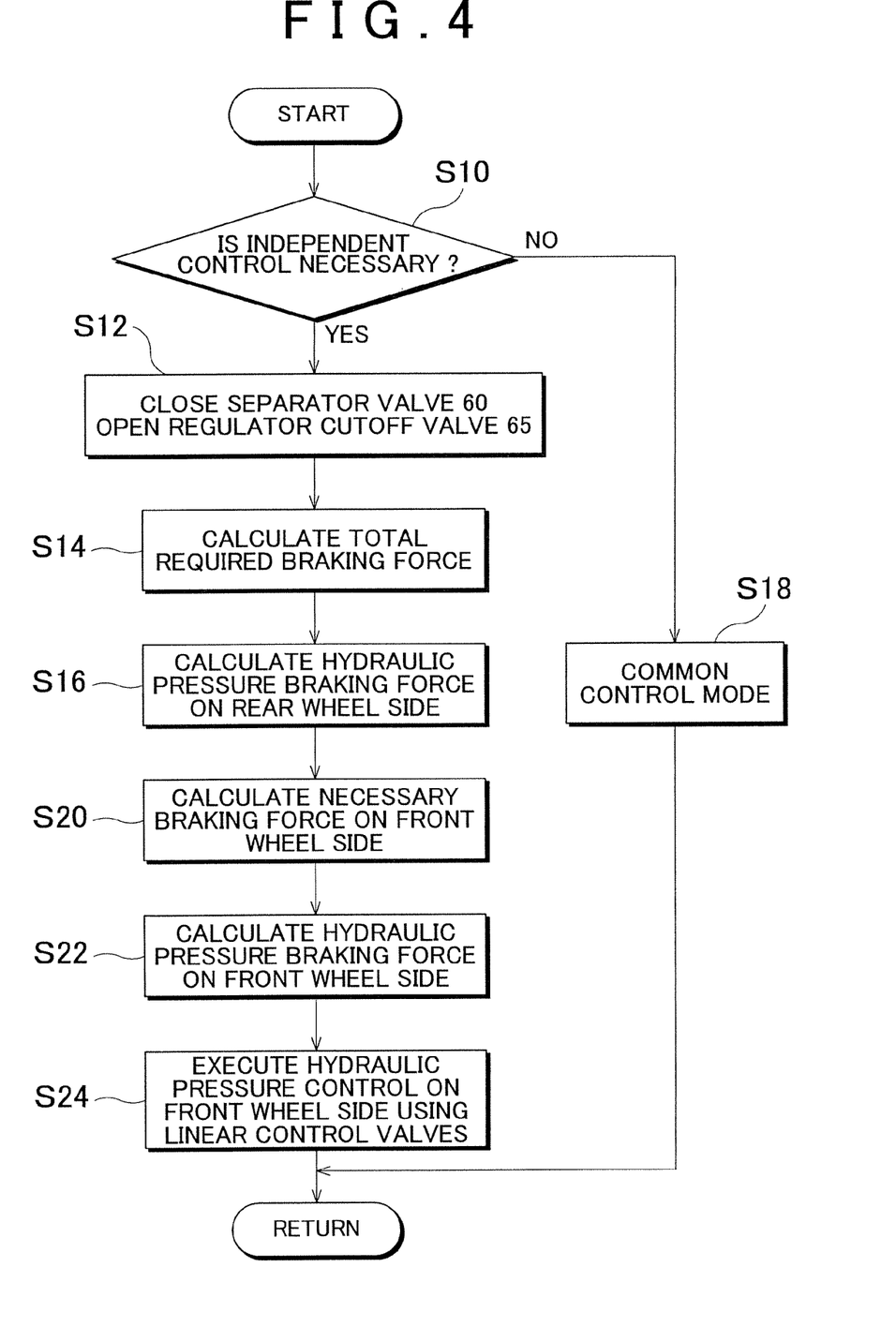
FIG. 4 is a flowchart illustrating a routine of an independent control mode according to the first example embodiment.

FIG. 4 is a flowchart illustrating a routine of the independent control mode according to the first example embodiment. The routine in the drawing is repeatedly executed in predetermined cycles, such as every several msecs, after a brake command is generated by, for example, an operation of the brake pedal 24 by the driver.

As shown in FIG. 4, when a brake command is generated and the routine starts, the brake ECU 70 first determines whether it is necessary to execute the independent control mode of this example embodiment (step S10). For example, the brake ECU 70 determines that it is necessary to execute the independent control mode when the effect from an offset in the braking force distribution on the vehicle stability is greater than it is when the vehicle is normally traveling straight ahead, as it may be when the vehicle is turning. Here, it can be determined whether the vehicle is turning by determining whether vehicle speed and curvature of the vehicle trajectory are exceeding predetermined values. The vehicle speed can be obtained by a wheel speed sensor or the like, and the curvature can be obtained from a measured value from the steering angle sensor or the like.

Further, the brake ECU 70 may also determine that it is necessary to execute the independent control mode when the driver suddenly operates the brake and requires a target deceleration that is equal to or greater than a predetermined value. Alternatively, the brake ECU 70 may determine that it is necessary to execute the independent control mode when the braking force distribution of the rear wheels is less than a predetermined value. In either case, setting each of the predetermined values so that the frequency of execution of the independent control mode increases is preferable in that it suppresses the deviation from the ideal braking force distribution, thereby increasing vehicle stability. In that case, however, the amount of hydraulic pressure braking force that is generated increases so all of the regenerative braking force that can be generated may not be able to be used. Also, it may be desirable in some cases to set the braking force distribution from the perspective of brake feeling imparted to the driver. Accordingly, one cannot categorically say that the predetermined values described above should be set so that the frequency with which the independent control mode is executed increases. Rather, it is desirable to set the predetermined values appropriately through testing, for example, taking various perspectives such as vehicle stability, fuel efficiency performance, or brake feeling into account.

If it is determined that it is not necessary to execute the independent control mode (i.e., No in step S10), then the brake ECU 70 controls the braking force according to the common control mode described above (step S18). If, on the other hand, it is determined that it is necessary to execute the independent control mode (i.e., Yes in step S10), then the brake ECU 7 closes the separator valve 60 and opens the regulator cut-off valve 65 (step S12). Here, it is not necessary that the timing at which the separator valve 60 is closed and the regulator cut-off valve 65 is opened is simultaneous. They may be slightly offset.

Next, the brake ECU 70 calculates the total required braking force to be applied to the vehicle (step S14). The total required braking force is calculated based on the pedal depression force and the pedal stroke and the like of the brake pedal 24 by the driver, and the like. Once the total required braking force is calculated, the brake ECU 70 then calculates the hydraulic pressure braking force to be applied to the rear wheels (step S16). Because the regulator pressure is introduced into the wheel cylinders 23RR and 23RL on the rear wheel side, the brake ECU 70 calculates the hydraulic pressure braking force of the rear wheels based on the regulator pressure that is measured by the regulator pressure sensor 71.

Once the hydraulic pressure braking force of the rear wheels is calculated, the brake ECU 70 then calculates the braking force that needs to be applied to the front wheels in order to apply the total required braking force to the vehicle (step S20). This necessary braking force for the front wheel side is calculated by subtracting the hydraulic pressure braking force of the rear wheels from the total required braking force. Once the necessary braking force of the front wheels is calculated in this way, the brake ECU then calculates the hydraulic pressure braking force of the front wheels (step S22). This hydraulic pressure braking force of the front wheels is calculated as the difference of the regenerative braking force applied to the front wheels subtracted from the necessary braking force on the front wheel side. Once the hydraulic pressure braking force to be applied to the front wheels is obtained in this way, the brake ECU 70 then calculates a target hydraulic pressure of the wheel cylinders 23FR and 23FL on the front wheel side and controls the current supplied to the pressure increase linear control valve 66 and the pressure decrease linear control valve 67 so that the wheel cylinder pressure on the front wheel side comes to match the target hydraulic pressure (step S24). As a result, the calculated hydraulic pressure braking force is applied to the front wheels. In conjunction with this, regenerative braking force is applied to the front wheels and a hydraulic pressure braking force according to the regulator pressure is applied to the rear wheels. Thus the total required braking force is applied to the vehicle as the sum of these braking forces.

As described above, according to this example embodiment, the brake ECU 70 closes the separator valve 60 in a predetermined case in which the effect on vehicle stability from the braking force distribution being offset to the front wheel side while the common control mode is being executed may be greater than it is when the vehicle is normally traveling straight ahead. The brake ECU 70 then continues the coordinated regenerative brake control on the front wheel side after the separator valve 60 closes, while quickly introducing regulator pressure to the rear wheel side to increase the hydraulic pressure braking force. As a result, the wheel cylinder pressure on the rear wheel side increases more than the wheel cylinder pressure on the front wheel side without the driver having to perform an additional brake operation, thus enabling the braking force distribution to be quickly improved. At this time coordinated regenerative control continues to be executed on the front wheel side so fuel efficiency of the vehicle can be improved due to using regenerative braking force while vehicle stability is also improved.

In this example embodiment, the wheels to which both the regenerative braking force and the hydraulic pressure braking force are applied, i.e., the first wheels, are the front wheels and the wheels to which only the hydraulic pressure braking force is applied, i.e., the second wheels, are the rear wheels, but the invention is not limited to this. Instead, for example, only the hydraulic pressure braking force may be applied to the front wheels and both the regenerative braking force and the hydraulic pressure braking force may be applied to the rear wheels. Other combinations may also be used.

Next, a second example embodiment of the invention will be described. The second example embodiment differs from the first example embodiment described above in that the separator valve 60 closes when an abnormality is detected in either one of the first system and the second system of the hydraulic pressure brake unit 20.

If an abnormality occurs in the hydraulic pressure brake unit 20 while coordinated regenerative brake control is being executed according to the common control mode described above, the brake ECU 70 can ensure braking force by switching the control mode to a hydrobooster mode, for example. In the hydrobooster mode, the total required braking force is generated by only the hydraulic pressure braking force, i.e., without using the regenerative braking force.

More specifically, in the hydrobooster mode, the brake ECU 70 opens the master cut-off valve 64 and the regulator cut-off valve 65, and closes the separator valve 60 and the simulator cut-off valve 68. Also, control of the pressure increase linear control valve 66 is cancelled so that brake fluid stops being supplied from the power hydraulic pressure source 30 to the wheel cylinders 23. As a result, master cylinder pressure is transmitted to the wheel cylinders 23FR and 23FL on the front wheel side and regulator pressure is transmitted via the second system to the wheel cylinders 23RR and 23RL on the rear wheel side such that braking force is applied to all of the wheels.

In the common control mode, the regenerative braking force is used as described above so that the hydraulic pressure braking force applied to the wheels is relatively small. Also in the common control mode, brake fluid discharged from the master cylinder 32 by a brake operation of the driver is consumed by the stroke simulator 69. Accordingly, the driver must depress the brake pedal 24 farther in order to introduce master cylinder pressure to the wheel cylinders 23 when the control mode switches from the common control mode to the hydrobooster mode. As a result, when the control mode switches and the use of regenerative braking force is cancelled, the braking force may decrease temporarily in the short time that it takes for the master cylinder pressure to be introduced to the wheel cylinders 23FR and 23FL on the front wheel side.

Figure 5:
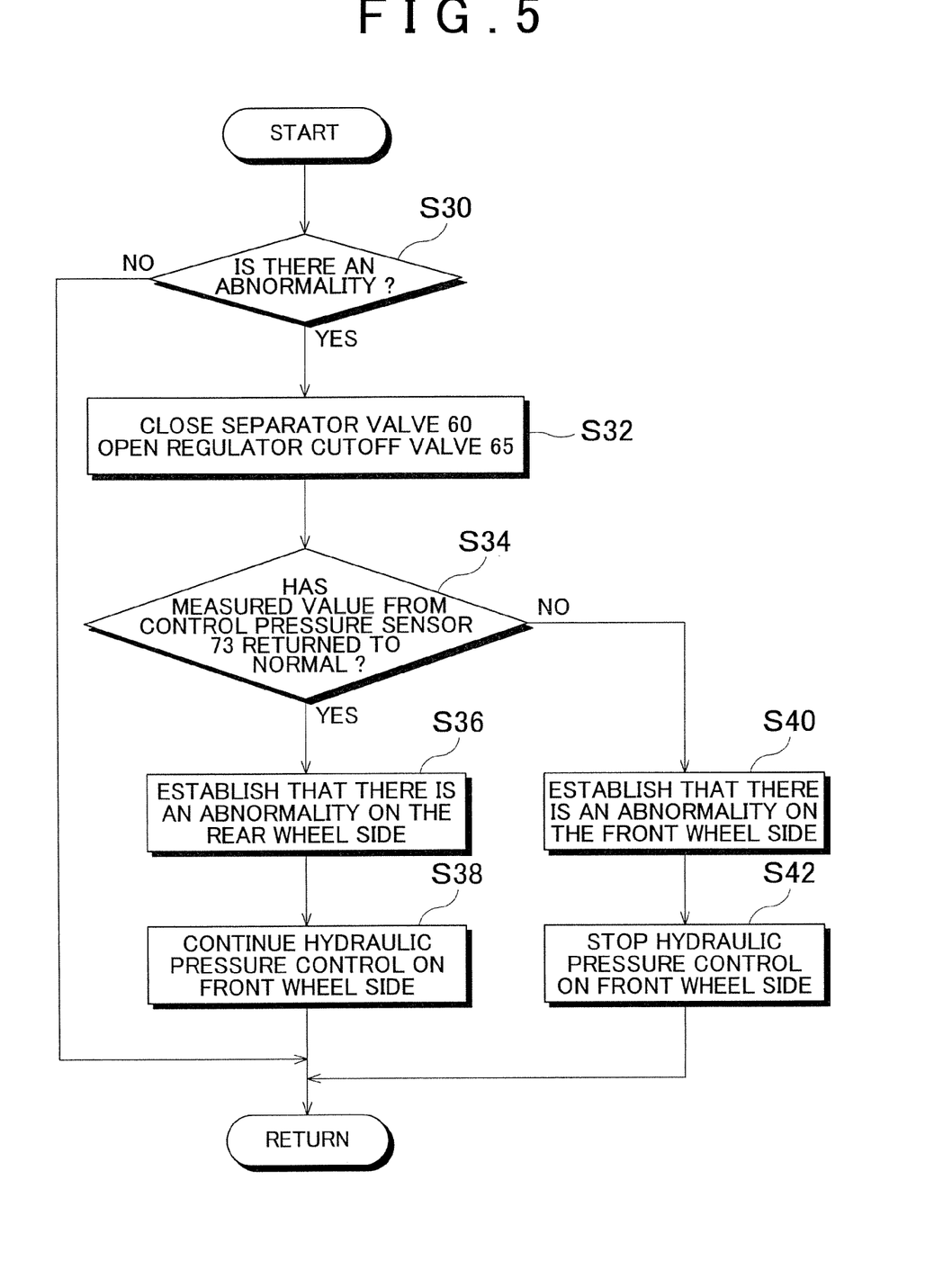
FIG. 5 is a flowchart illustrating a routine according to a second example embodiment.

Therefore, in the second example embodiment the routine shown in FIG. 5 is executed. The routine in FIG. 5 is repeatedly executed in predetermined cycles, such as every several msecs, while coordinated regenerative brake control is being executed. When the routine starts, the brake ECU 70 first determines whether there is an abnormality in either the first system or the second system in the hydraulic pressure brake unit 20 (step S30). The brake ECU 70 determines that an abnormality has occurred when, for example, a difference between the value of a common target hydraulic pressure for the wheel cylinder pressures and the actual values of the wheel cylinder pressures continues to exceed a reference value for a predetermined period of time or longer. The actual wheel cylinder pressure is measured by the control pressure sensor 73.

If an abnormality is not detected (i.e., No in step S30), then the routine of this example embodiment does not need to be executed so the brake ECU 70 ends the routine and executes it again at the next execution timing. If, on the other hand, an abnormality is detected (i.e., Yes in step S30), then the brake ECU 70 closes the separator valve 60 and opens the regulator cut-off valve 65 (step S32). Here, it is not necessary that the timing at which the separator valve 60 is closed and the regulator cut-off valve 65 is opened is simultaneous. They may be slightly offset. Also, the master cut-off valve 65 is kept closed at this time.

Opening the regulator cut-off valve 65 enables brake fluid to be supplied from the regulator 33 to the wheel cylinders 23RR and the 23RL on the rear wheel side. Brake fluid is also supplied from the power hydraulic pressure source 30 to the wheel cylinders 23FR and 23FL on the front wheel side by having the brake ECU 70 continue to control the pressure increase linear control valve 66 and the pressure decrease linear control valve 67.

Next, the brake ECU 70 determines whether the measured value from the control pressure sensor 73 has returned to normal (step S34). In this example embodiment, the control pressure sensor 73 is provided in the first flow line 45*a* of the main flow line 45, i.e., on the front wheel side. Accordingly, the brake ECU 70 determines that the measured value from the control pressure sensor 73 has returned to normal when, for example, the difference between the target hydraulic pressure of the wheel cylinder pressure on the front wheel side and the actual hydraulic pressure of the wheel cylinders 23FR and 23FL on the front wheel side has dropped below a reference value within a predetermined period of time after the separator valve 60 has been closed.

If it is determined that the measured value of the control pressure sensor 73 has returned to normal (i.e., Yes in step S34), then the brake ECU 70 determines that an abnormality has occurred on the rear wheel side, i.e., that an abnormality has occurred in the second system of the hydraulic pressure brake unit 20 (step S36). This is because if the measured value from the control pressure sensor 73 on the front wheel side returns to normal after the second system has been cut off by closing the separator valve 60, it means that an abnormality has not occurred in the first system that supplies the brake fluid to the front wheel side. That is, in this case, it is possible to establish that there is an abnormality in the second system that supplies brake fluid to the rear wheel side.

If it is established that an abnormality has occurred on the rear wheel side, then the brake ECU 70 controls the wheel cylinder pressure on the front wheel side by continuing to control the pressure increase linear control valve 66 and the pressure decrease linear control valve 67 to generate the total required braking force with only the front wheels (step S38). At this time, the brake ECU 70 executes coordinated regenerative brake control on only the front wheels and generates the total required braking force using a combination of regenerative braking force and hydraulic pressure braking force. In this case, the mode may shift to the hydrobooster mode from the next time that braking is performed or coordinated regenerative brake control may continue to be executed on only the front wheel side.

If, on the other hand, it is determined that the measured value from the control pressure sensor 73 has not returned to normal (i.e., No in step S34), then the brake ECU 70 determines that there is an abnormality on the front wheel side, i.e., that an abnormality has occurred in the first system of the hydraulic pressure brake unit 20 (step S40). The brake ECU 70 then stops control of the wheel cylinder pressure on the front wheel side by stopping control of the pressure increase linear control valve 66 and the like (step S42). In this case, braking force is applied to the rear wheels by regulator pressure introduced to the wheel cylinders 23RR and 23RL on the rear wheel side so that the total require braking pressure is applied to the vehicle.

As described above, according to this example embodiment, the brake ECU 70 closes the separator valve 60 when an abnormality has been detected in either the first system or the second system. As a result, the system in which the abnormality was detected can be cut off from the system in which no abnormality was detected. Accordingly, operating fluid can continue to be supplied from the power hydraulic pressure source 30 to the system in which no abnormality was detected, thus improving the failsafe ability.

Also, the brake ECU 70 establishes which of the two systems an abnormality has occurred in based on the hydraulic pressure fluctuation in one of the first and second systems after closing the separator valve 60. As a result, braking force can be ensured by supplying brake fluid from the power hydraulic pressure source 30 to the wheel cylinders 23 via the system in which an abnormality has not occurred.

Moreover, in this example embodiment, if an abnormality has not occurred in the first system, the brake ECU 70 continues to control the pressure increase linear control valve 66 and the like so that control hydraulic pressure continues to be introduced from the power hydraulic pressure source 30 into the wheel cylinders 23. Accordingly, the necessary control hydraulic pressure can be applied to the wheel cylinders 23 without the driver having to perform an additional brake operation. Also, the brake ECU 70 continues to execute coordinated regenerative brake control so that regenerative braking force continues to be used, which suppresses a temporary decrease in braking force that occurs when switching control modes when an abnormality has occurred.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A brake control system of a vehicle, comprising:
a plurality of wheel cylinders including a first wheel cylinder for applying braking force to a first wheel and a second wheel cylinder for applying braking force to a second wheel;
a power hydraulic pressure source able to generate, by a supply of power, a high hydraulic pressure independent of a brake operation by a driver;
a manual hydraulic pressure source that includes a master cylinder which pressurizes operating fluid in accordance with a brake operation amount and a regulator which regulates the hydraulic pressure of the power hydraulic pressure source in accordance with a hydraulic pressure of the master cylinder;
a first system including a first control valve disposed between the power hydraulic pressure source and the plurality of wheel cylinders and a second control valve disposed upstream of the plurality of wheel cylinders between a reservoir return line and the plurality of wheel cylinders, such that the first system connects the power hydraulic pressure source with both the first and second wheel cylinders, regulates the hydraulic pressure of operating fluid from the power hydraulic pressure source, and applies a common hydraulic pressure to both the first and second wheel cylinders;
a separator valve that cuts off a supply of operating fluid to the second wheel cylinder via the first system when the separator valve is closed;
a second system which connects the regulator to the second wheel cylinder such that operating fluid can be supplied from the power hydraulic pressure source via the regulator to the second wheel cylinder regardless of whether the separator valve is open or closed;
a control portion that switches a brake mode from a first brake mode in which the common hydraulic pressure is applied to both the first and second wheel cylinders by the first system to a second brake mode in which the separator valve is closed so that the hydraulic pressure is applied to the first wheel cylinder by the first system and the hydraulic pressure that is regulated by the regulator is applied to the second wheel cylinder by the second system; and
a regenerative brake unit that applies braking force to the first wheel by regenerative control of a motor, wherein
the first control valve is disposed in a first flow line in which the fluid flows to the plurality of wheel cylinders,
the second control valve is downstream of the first control valve and disposed in a second flow line that branches from the first flow line and that is connected to the reservoir return line, and
the control portion increases the hydraulic pressure applied to the second wheel cylinder via the second system more than the hydraulic pressure applied to the first wheel cylinder via the first system by switching the brake mode from the first brake mode to the second brake mode when the braking force applied to the first wheel is a combination of regenerative braking force and hydraulic pressure braking force and a predetermined condition is satisfied.

2. The brake control system according to claim 1, wherein:
the second system includes a third control valve provided between the regulator and the second wheel cylinder; and
the control portion increases the hydraulic pressure applied to the second wheel cylinder by closing the separator valve to cut off the supply of operating fluid to the second wheel cylinder via the first system and supplying operating fluid that was pressure-regulated by the regulator to the second wheel cylinder by opening the third control valve.

3. The brake control system according to claim 2, wherein the control portion opens the separator valve and closes the third control valve to apply the hydraulic pressure of operating fluid from the power hydraulic pressure source to both the first and second wheel cylinders via the first system when the vehicle is not under the predetermined condition.

4. The brake control system according to claim 1, wherein the control portion controls the first system to generate a remaining braking force obtained by subtracting the braking force obtained through regeneration from a total required braking force that needs to be applied to the vehicle when the vehicle is not under the predetermined condition.

5. The brake control system according to claim 1, wherein the predetermined condition is satisfied when a braking force distribution of the second wheel is less than a predetermined value.

6. The brake control system according to claim 1, wherein the predetermined condition is satisfied when the vehicle is turning.

7. The brake control system according to claim 1, wherein the predetermined condition is satisfied when a target deceleration that exceeds a predetermined value is required.

8. The brake control system according to claim 1, wherein the control portion generates braking force to be applied to the first wheel using the combination of regenerative braking force and hydraulic pressure braking force when the separation valve is closed.

9. The brake control system according to claim 1, wherein, when the control portion increases the hydraulic pressure applied to the second wheel cylinder more than the hydraulic pressure applied to the first wheel cylinder, the control portion calculates the hydraulic pressure braking force of the second wheel cylinder, and controls the hydraulic pressure of the first system to apply a remaining braking force to the first wheel cylinder, the remaining braking force being obtained by subtracting the hydraulic pressure braking force of the second wheel cylinder and the regenerative braking force from a total required braking force that needs to be applied to the vehicle.

10. The brake control system according to claim 1, wherein the control portion, when an abnormality has been detected in one of the first system and the second system, closes the separator valve to cut off the supply of operating fluid to the second wheel cylinder via the first system and supplies operating fluid to the second wheel cylinder via the second system.

11. The brake control system according to claim 10, wherein the control portion establishes which of the systems an abnormality has occurred in based on a fluctuation in the hydraulic pressure of one of the first system and the second system after closing the separator valve.

12. The brake control system according to claim 1, wherein the first wheel is the right front wheel and/or the left front wheel, and the second wheel is the right rear wheel and/or the left rear wheel.

13. A control method for a brake control system includes
applying braking force to a first wheel by a first wheel cylinder;
applying braking force to a second wheel by a second wheel cylinder;
generating, by a supply of power, a high hydraulic pressure independent of a brake operation by a driver, by a power hydraulic pressure source;
pressurizing operating fluid in accordance with a brake operation amount, by a master cylinder included in a manual hydraulic pressure source;
connecting the power hydraulic pressure source with both the first and second wheel cylinders via a first control valve, regulating the hydraulic pressure of operating fluid from the power hydraulic pressure source with a second control valve disposed upstream of the first and second wheel cylinders between a reservoir return line and the first and second wheel cylinders, and applying a common hydraulic pressure to both the first and second wheel cylinders, by a first system;
cutting off a supply of operating fluid to the second wheel cylinder via the first system by closing a separator valve;
regulating the hydraulic pressure of the power hydraulic pressure source in accordance with a hydraulic pressure of the master cylinder, by a regulator included in the manual hydraulic pressure source;
connecting the regulator to the second wheel cylinder such that operating fluid can be supplied from the power hydraulic pressure source via the regulator to the second wheel cylinder regardless of whether the separator valve is open or closed, by a second system; switching a brake mode from a first brake mode in which common hydraulic pressure is applied to both the first and second wheel cylinders by the first system to a second brake mode in which the separator valve is closed so that the hydraulic pressure is applied to the first wheel cylinder by the first system and the hydraulic pressure that is regulated by the regulator is applied to the second wheel cylinder by the second system, by a control portion;
applying braking force to the first wheel by regenerative control of a motor, by a regenerative brake unit; and
increasing the hydraulic pressure applied to the second wheel cylinder via the second system more than the hydraulic pressure applied to the first wheel cylinder via the first system when the braking force applied to the first wheel is a combination of regenerative braking force and hydraulic pressure braking force and a predetermined condition is satisfied, wherein
the first control valve is disposed in a first flow line in which the fluid flows to the plurality of wheel cylinders, and
the second control valve is downstream of the first control valve and disposed in a second flow line that branches from the first flow line and that is connected to the reservoir return line.

14. The brake control system according to claim 1,
wherein the power hydraulic pressure source includes a pump and an accumulator, and
wherein the accumulator is provided upstream of the first control valve via an accumulator conduit.

15. The brake control system according to claim 14,
wherein the regulator is connected to the accumulator via a branch conduit that branches from the accumulator conduit at a position upstream of the first control valve, and
wherein the regulator is connected to the plurality of wheel cylinders via a regulator conduit.

16. The brake control system according to claim 15, wherein the regulator conduit and the accumulator conduit are connected to the plurality of wheel cylinders in parallel.

17. The brake control system according to claim 1, further comprising:
- a main flow line that includes the separator valve, wherein
- the first control valve is disposed between the power hydraulic pressure source and the main flow line, and
- the second flow line is disposed directly between the reservoir return line and the main flow line.

18. The brake control system according to claim 17, wherein
- an outlet of the first control valve is connected to the main flow line, and
- an inlet of the second flow line is directly connected to the main flow line.

* * * * *